(12) United States Patent
Horng et al.

(10) Patent No.: US 7,536,772 B2
(45) Date of Patent: May 26, 2009

(54) METHOD OF MANUFACTURING A BOTTOM SPIN VALVE WITH A LAMINATED COFE FREE LAYER

(75) Inventors: Cheng T. Horng, San Jose, CA (US); Ru-Ying Tong, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 459 days.

(21) Appl. No.: 11/269,370

(22) Filed: Nov. 8, 2005

(65) Prior Publication Data

US 2006/0117555 A1    Jun. 8, 2006

Related U.S. Application Data

(62) Division of application No. 10/460,086, filed on Jun. 12, 2003, now Pat. No. 6,993,827.

(51) Int. Cl.
   *G11B 5/187*    (2006.01)
(52) U.S. Cl. .............. 29/603.08; 29/603.13; 29/603.14; 360/324.1; 360/324.11; 360/324.12
(58) Field of Classification Search .............. 29/603.07, 29/603.13, 603.14, 603.15, 603.08, 603.18, 29/603.12; 360/324, 324.1, 324.11, 324.12, 360/322, 326
   See application file for complete search history.

(56) References Cited

U.S. PATENT DOCUMENTS 5,793,279 A * 8/1998 Nepela .................... 360/324 X
6,201,671 B1   3/2001 Pinarbasi ................ 360/324.11
6,208,492 B1   3/2001 Pinarbasi ................ 360/324.11
6,222,707 B1   4/2001 Huai et al. ................ 360/324.1
6,338,899 B1   1/2002 Fukuzawa et al. ........... 728/332
6,400,536 B1   6/2002 Gill ........................ 360/324.12
6,404,606 B1   6/2002 Pinarbasi ................ 360/324.11
6,785,954 B2   9/2004 Horng et al. ............. 29/603.14
2003/0005575 A1* 1/2003 Tsuchiya et al. ...... 29/603.13 X

FOREIGN PATENT DOCUMENTS

JP         06236527 A  *  8/1994
JP       2001126219 A  *  5/2001

OTHER PUBLICATIONS

U.S. Appl. No. 10/308,597, filed Dec. 3, 2002, "Novel Seed Layers for Fabricating Spin Valve Heads for Ultra-High Density Recordings," assigned to the same assignee.
U.S. Appl. No. 10/460,088, filed Jun. 12, 2003, "A Novel Structure/ Method to Form Bottom Spin Valves for Ultra-High Density", assigned to the same assignee.
"Spin Filter Spin Valve Heads With Ultrathin Co Fe Free Layers", by H. Iwasaki et al., Abstract BA-04, 1999 Intermag. Conference.

* cited by examiner

*Primary Examiner*—A. Dexter Tugbang
(74) *Attorney, Agent, or Firm*—Saile Ackerman LLC; Stephen B. Ackerman

(57) ABSTRACT

A method is given for the manufacture of a bottom spin valve (BSV) spin filter spin valve (SFSV) type read sensor. The sensor has a composite, ultra-thin (<20 Angstroms) laminated free layer formed as a Cu high conductance layer (HCL) between two layers of CoFe. A second HCL is formed as a layer of Ru on the composite free layer. By adjusting the thicknesses of the two HCL's, the free layer will have low coercivity and tunable magnetostriction. The sensor is capable of reading densities exceeding 60 Gb/in$^2$.

7 Claims, 2 Drawing Sheets

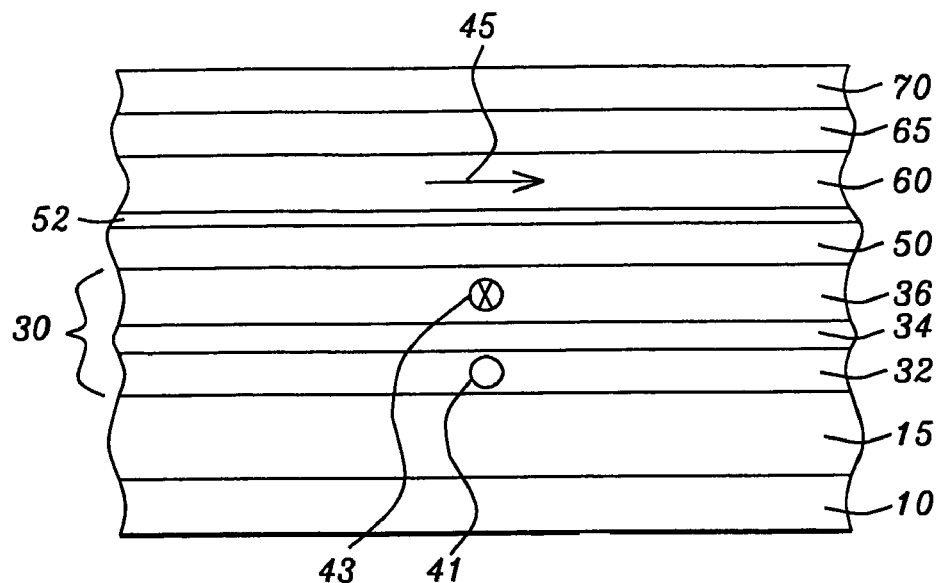
FIG. 1 – Prior Art
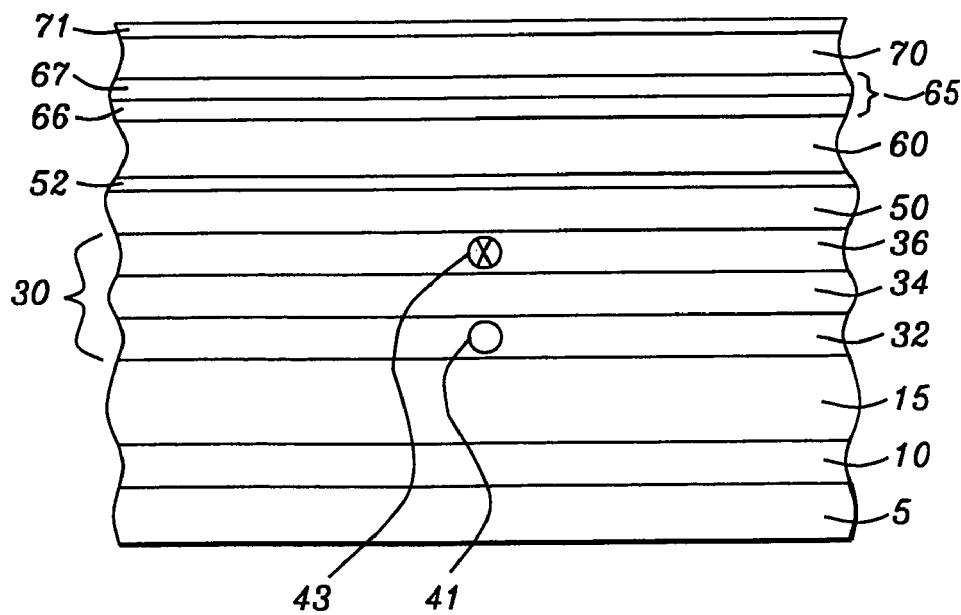
FIG. 2a

US 7,536,772 B2

METHOD OF MANUFACTURING A BOTTOM SPIN VALVE WITH A LAMINATED COFE FREE LAYER

RELATED PATENT APPLICATION

This is a division of patent application Ser. No. 10/460,086, filing date Jun. 12, 2003, Bottom Spin Valve With Laminated CoFe Free Layer For Ultra-High Density Recording, now issued as U.S. Pat. No. 6,993,827, assigned to the same assignee as the present invention, which is herein incorporated by reference in its entirety.

This application is related to Ser. No. 10/124,004 filing date Apr. 17, 2002, now issued as U.S. Pat. No. 6,785,954 and to Ser. No. 10/308,597, filing date Dec. 3, 2002 both assigned to the same assignee as the current invention.

BACKGROUND OF THE INVENTION

1. Field of the Invention

This invention relates generally to GMR read heads of the bottom spin valve and, more particularly, to a spin-filter type of bottom spin valve having an high-conductance layer and an ultra-thin CoFe free layer which has positive magnetostriction and high output.

2. Description of the Related Art

Magnetic read heads whose sensors make use of the giant magnetoresistive effect (GMR) in the bottom spin-valve configuration (BSV) are being increasingly required to read information recorded on magnetic media at ultra-high area densities (e.g. >45 Gb/in$^2$). The typical BSV sensor configuration includes (in vertically ascending order) a pinning layer, a pinned layer, a conductive spacer layer, a ferromagnetic free layer and a capping layer. Sensing current is introduced into and extracted from this configuration by laterally disposed leads. Again, typically, the pinning layer is a layer of antiferromagnetic material (AFM) which pins (fixes in space) the magnetic moment of the pinned layer (typically a layer of ferromagnetic material) in a direction normal to the plane of the air-bearing surface (ABS) of the sensor. The magnetic moment of the ferromagnetic free layer, not being pinned, is free to rotate with respect to that of the pinned layer under the influence of external magnetic fields and it is those rotations that cause the resistance of the sensor, R, to vary (dR) and, in combination with the sensing current, to produce an electrical signal. The GMR effect, which is relied upon to give maximum resistance variations, dR, for given rotations of the free layer magnetic moment, is a result of the scattering of conduction electrons in the spacer layer by the surfaces of the pinned and free layers that bound it. This scattering is spin-dependent and a function of the relative orientations of the two magnetic moments.

In order for the dR to be reproducible and invariant under symmetric changes in the external field, the magnetic moment of the free layer should return to the same position (the bias point) when no external magnetic signals are present (the quiescent state). The bias point of the free layer is typically made to be perpendicular to the pinned moment of the pinned layer, ie. in the plane of the ABS.

To be capable of reading ultra-high area densities, the BSV sensor must be able to resolve extremely high linear bit densities, bits-per-inch, (BPI) and track densities, tracks-per-inch, (TPI), which, in turn, requires that it have an extremely narrow trackwidth and ultra-thin free layer (thickness <20 angstroms) to maintain high signal output. Unfortunately, as the free layer is made increasingly thin, it becomes difficult to obtain a controllable bias point, a high GMR ratio (dR/R) and good softness (low coercivity). Utilizing synthetic antiferromagnetic (SyAF) pinned layers (ferromagnetic layers coupled with their magnetic moments antiparallel) can reduce magnetostatic fields between the pinned and free layers which adversely affect the biasing; but if the free layer is sufficiently thin, even the magnetic fields produced by the sensing current have an adverse affect.

The prior art teaches several methods for increasing the GMR ratio of a BSV sensor. Pinarbasi (U.S. Pat. No. 6,201,671) teaches the formation of a nickel oxide (NiO) pinning layer formed on a tantalum oxide (TaO) seed layer, which offers an improved GMR ratio for both SyAP pinned layers and simple ferromagnetic pinned layers. The free layer is a 70 angstrom thick layer of NiFe. Pinarbasi (U.S. Pat. No. 6,208,492) teaches the formation of an iridium manganese (IrMn) pinning layer formed on a bilayer seed layer which is a layer of nonmagnetic metal formed on a layer of metallic oxide. The free layer is a CoFe/NiFe bilayer in which the CoFe is 15 angstroms in thickness and the NiFe is 45 angstroms in thickness. Pinarbasi (U.S. Pat. No. 6,404,606) teaches the formation of an improved seed layer structure for a PtMn pinning layer in which the seed layer includes a first layer of aluminum oxide, a second layer of nickel manganese oxide and a third layer of tantalum. The seed layer increases the pinning and exchange coupling fields between the pinning and pinned layers which improves recovery of the pinned layer magnetic moment if it subjected to temperatures above the blocking temperature and reversal of its magnetic moment. Gill (U.S. Pat. No. 6,400,536) teaches the formation of a free layer with an improved uniaxial anisotropy. The layer is a triple layer wherein each of the three layers has a different uniaxial anisotropy constant and the three layers are mutually exchange coupled. An exemplar of the free layer consists of a 10 angstrom CoFe layer on which on which is formed a 30 angstrom NiFe layer and on which is formed a 10 angstrom CoFe layer. Huai (U.S. Pat. No. 6,222,707) teaches a bottom or a dual spin valve with a seed layer on which is grown an antiferromagnetic (AFM) pinning layer or a synthetic antiferromagnetic (SyAF) pinned layer. When used to grow the AFM layer, the seed layer improves texture of the fcc lattice structure. When used to grow the SyAF layer, the seed layer improves exchange coupling. Fukuzawa et al. (U.S. Pat. No. 6,338,899) discuss the advantageous nature of oxidized metallic layers and also teach the formation of TaO layers in a variety of spin valve configurations.

The prior art cited above have approached the matter of improving BSV performance differently, either by improving the performance of the pinned/pinning layer by the use of novel seed layers or by improving the performance of the free layer with novel composite structures. None of the art cited has specifically addressed the problem of free layer biasing for an ultra-thin free layer (less than 20 angstroms in thickness). To overcome this significant problem, a spin-filter spin valve (SFSV) configuration has been introduced (see H. Iwashaki et al., "Spin Filter Spin Valve Heads With Ultarthin CoFe Free Layers," Abstract BA-04, 1999 Intermag. Conference) in which the free layer is placed between the usual Cu spacer layer and an additional high-conductance-layer (HCL). This configuration reduces the sense current field in the free layer by shifting the sense current center towards the free layer. This results in the sense current producing a small bias point shift. In addition, the SFSV configuration allows the use of an ultra-thin CoFe free layer which, when combined with a properly formed HCL, has an advantageous small positive magnetostriction combined with a high output.

SUMMARY OF THE INVENTION

It is a first object of the present invention to provide a high signal output, bottom spin valve (BSV) giant magnetoresistive (GMR) sensor of the spin filter spin-valve (SFSV) type having a high-conductance layer, a synthetic antiferromagnetic (SyAF) pinned layer and capable of reading high area density magnetic recordings of densities exceeding 45 Gb/in$^2$ (gigabits per square inch).

It is a second object of the present invention to provide such a BSV SFSV GMR sensor having an ultra-thin (<20 angstroms thick) ferromagnetic free layer of high softness (low coercivity).

It is a third object of the present invention such a BSV SFSV GMR sensor whose ultra-thin ferromagnetic free layer provides an advantageous small positive magnetostriction.

It is a fourth object of the present invention to provide such a BSV SFSV GMR sensor having a stable and controllable bias point.

It is a fifth object of the present invention to provide such a BSV SFSV GMR sensor having a magnetic read width (MRW) (effective trackwidth) of 0.15 microns or less and a physical trackwidth (MRT) (actual width of the active sensor region) which is even less than the MRW.

It is a sixth object of the present invention to provide a method of forming the BSF SFSV GMR sensor having the properties and advantages described above.

The objects of the present invention will be achieved by an SyAF BSV SFSV GMR sensor stack (the unpatterned arrangement of layers) illustrated in cross-sectional (ABS plane) schematic form in FIG. 1 and having the following generic (prior art) configuration:

buffer layer/AFM pinning layer/SyAF pinned layer/spacer layer/oxygen surfactant layer/ferromagnetic free layer/high conductance layer/capping layer(oxidized).

Referring to FIG. 1 and the configuration above, it is first noted that the buffer (or seed) layer (10), the oxygen surfactant layer (52) formed on the spacer layer (50) and the oxidized capping layer (70) (oxidized during the pinned layer annealing process) are all used to greatly enhance the GMR ratio (dR/R) of the sensor. The buffer layer would typically be a layer of NiCr (with approximately 40% Cr by atomic weight) formed to a thickness of approximately 55 angstroms. The antiferromagnetic pinning layer (15) is normally a layer of antiferromagnetic material such as MnPt and is formed to a thickness of approximately 100 angstroms. The SyAF pinned layer (30) is a trilayer comprising a second ferromagnetic layer (32), a first ferromagnetic layer (36) and a coupling layer (34) of a material and critical thickness designed to coupled the magnetic moments of the ferromagnetic layers in antiparallel directions. Typical of the prior art would be second and first ferromagnetic layers both formed of CoFe and of approximate thicknesses 15 and 20 angstroms respectively. The coupling layer (34) producing the antiparallel magnetic moment configuration is typically a layer of Ru formed to a thickness of approximately 7.5 angstroms. This is a critical thickness as it is required to make the antiparallel configuration energetically favorable and variations in thickness not exceeding 0.5 angstroms are preferable. The magnetic moments of the two ferromagnetic layers are indicated as oppositely directed arrows (circle (41) and circle with cross (43)) normal to the cross-sectional plane of the drawing and the air bearing surface (ABS) of the sensor and are respectively out of and into the plane. This normal direction is hereinafter called the transverse direction. The surface of the non-magnetic spacer layer (50) separating the pinned layer from the free layer is treated in an oxygen ambient so that a very thin sub-atomic mono-layer) of oxygen (52) is adsorbed on the surface distal from the pinned layer. This is the oxygen surfactant layer which generally enhances adhesion. As noted earlier, the spacer layer is a region of spin-dependent scattering of conduction electrons and its material composition and thickness is critical to obtaining the GMR effect of the sensor. Typically, the spacer layer is a layer of Cu formed to a thickness of approximately 18 angstroms. The ferromagnetic free layer (60) is formed on the oxygen surfactant layer of the spacer layer. This layer can be a single material layer or a composite layer and its thickness is critical to the definition of the resolution of the sensor. For example, for sensors operating in the 45 Gb/in$^2$ range, a CoFe(10)/NiFe (20) composite free layer has been used, whereas for sensors operating in the 60 Gb/in$^2$ range, a thinner composite CoFe (5)/NiFe(20) free layer has been used. The magnetization of the free layer is typically in the plane of the ABS and in the plane of the free layer itself, this direction being hereinafter referred to as the longitudinal direction, and is indicated in the figure as arrow (45). A high-conductance layer (HCL) (65) is then formed on the free layer, the HCL being typically a layer of Cu, which is a material with high conductivity, formed to a thickness of approximately 5 angstroms. The purpose of this layer is to direct the sensing current along the free layer and, thereby, to significantly reduce or eliminate the magnetic field of the sensing current as a mechanism for adversely affecting the free layer bias point. Finally, a capping layer is formed (70) on the HCL, typically a Ta layer approximately 10-20 angstroms thick. When this sensor stack is exposed to an oxidizing ambient during annealing to fix the magnetizations of the pinned and free layers, (or to an oxygen plasma used in reactive ion etching (RIE)), the capping layer (70) is oxidized to a depth depending upon the annealing time and temperature and a TaO insulating layer is formed which also serves as a specularly reflecting layer that greatly enhances sensor signal output. It is further noted that depending upon the type of conducting leads being formed, only selected regions of the capping layer may be oxidized. This will be further discussed in conjunction with the present invention as illustrated in FIG. 2b.

To achieve the objects of the present invention, the prior art stack described above will be modified in several novel ways including the replacement of the composite CoFe/NiFe free layer by an ultra-thin free layer formed either as a single CoFe layer or as a laminated CoFe/Cu/CoFe free layer and by replacement of the Cu HCL by a composite HCL formed of Cu and Ru films. The combination of the CoFe free layer and the composite HCL produce a free layer of softness (low coercivity) exceeding that of a prior art CoFe/NiFe composite free layer and with an advantageous positive magnetostriction. It is to be noted that if a single ultra-thin CoFe layer were used without the novel Cu/Ru HCL, the layer would exhibit negative magnetostriction. The exact structure of the sensor of the present invention and the method of its formation will be discussed in the description of the preferred embodiments below.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying figures, wherein:

FIG. 1 is a schematic drawing of a generic, prior art, SyAP BSV SFSV sensor configuration.

DESCRIPTION OF THE PREFERRED EMBODIMENTS

Figure 2B:
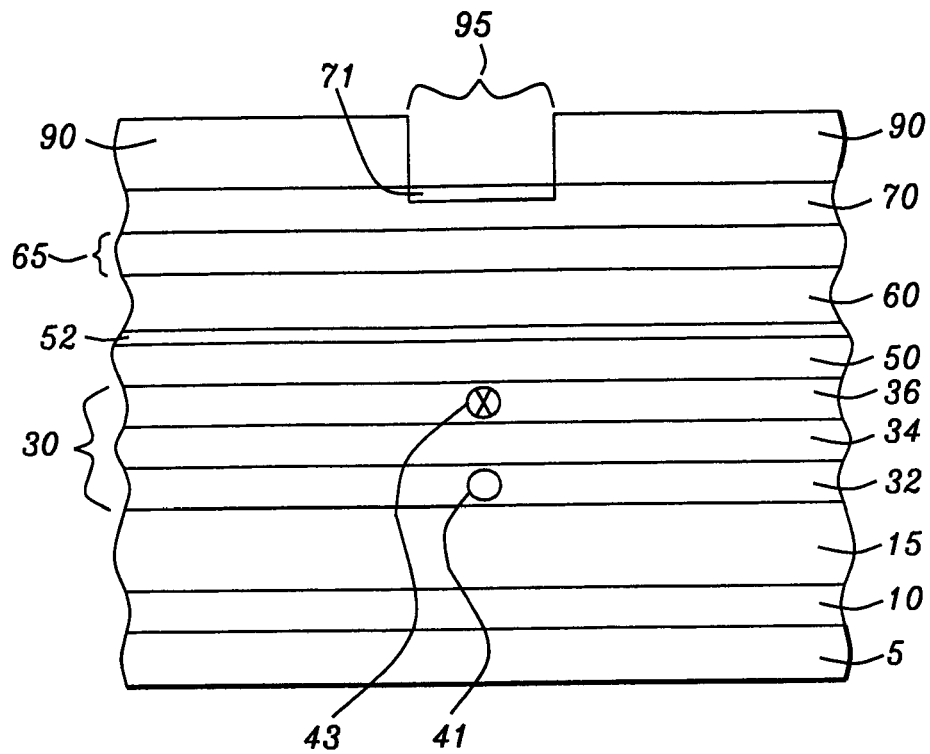
FIGS. 2a and b are schematic drawings of the sensor stack configuration of a first preferred embodiment (2a) of the present invention and of an exemplary patterned lead formation over the stack (2b).

To meet the objects of the present invention, the generic configuration of FIG. 1 will be replaced by either of the following preferred layer configurations i) and ii), each formed on an appropriate substrate (which is not indicated below):

i) NiCr(55)/MP(100)/CoFe(13)/Ru(7.5)/CoFe(15)/Cu(18)/SL/CoFe(20)/Cu(5)/Ru(7.5-10)/Ta(10)

ii) NiCr(55)/MP(100)/CoFe(13)/Ru(7.5)/CoFe(15)/Cu(18)/SL/CoFe(17)/Cu(3)/CoFe (3)/Ru(7.5-10)/Ta(10)

wherein the numbers in parentheses are preferred layer thicknesses in angstroms.

Referring first to FIG. 2a, there is seen in a schematic cross-sectional view the stack configuration described in i) above. Unlike the prior art of FIG. 1, this stack includes a single CoFe free layer (60) and a composite Cu/Ru high-conductance layer (65). Moving vertically upward in the figure, there is first seen a substrate (5) on which has been formed NiCr buffer layer (10), having approximately 40% Cr by atomic weight and formed to a thickness of between approximately 50 and 60 angstroms, with approximately 55 angstroms being preferred. The antiferromagnetic pinning layer (15) is preferably a layer of antiferromagnetic material such as MnPt and is formed to a thickness between approximately 80 and 150 angstroms, with approximately 100 angstroms being preferred. The SyAF pinned layer (30) is preferably a trilayer comprising a second ferromagnetic layer (32), a first ferromagnetic layer (36) and a coupling layer (34) of a material and critical thickness designed to coupled the magnetic moments of the ferromagnetic layers in antiparallel directions. In the present preferred embodiment the second and first ferromagnetic layers are both formed of CoFe, the second layer (32) being formed to a thickness between approximately 12 and 20 angstroms with approximately 13 angstroms being preferred and the first layer (36) being formed to a thickness between approximately 13 and 25 angstroms with approximately 15 angstroms being preferred. The coupling layer (34) producing the antiparallel magnetic moment configuration is a layer of Ru formed preferably to a thickness of approximately 7.5 angstroms. This is a critical thickness as it is required to make the antiparallel configuration energetically favorable and a thickness variation not exceeding (+ or −) 0.5 angstroms is preferred.

The magnetic moments of the two ferromagnetic layers, which are set by an annealing process, are indicated as oppositely directed arrows (circle (41) and circle with cross (43)) normal to the cross-sectional plane of the drawing and respectively out of and into the plane. The non-magnetic spacer layer (50) separating the pinned layer from the free layer is a layer of Cu formed to a thickness between approximately 15 and 20 angstroms, with approximately 18 angstroms preferred. The surface of the spacer layer is treated in an oxygen ambient to form thereon a very thin oxygen surfactant layer (52) (a sub-atomic mono-layer of oxygen) on the surface distal from the pinned layer. In the present invention the surfactant layer promotes planar growth of the subsequently formed free layer.

As noted above, the spacer layer is a region of spin-dependent scattering of conduction electrons and its material composition and thickness is critical to obtaining the GMR effect of the sensor. The ferromagnetic free layer (60) is formed on the oxygen surfactant layer of the spacer layer. This layer is a layer of CoFe formed to a thickness between approximately 15 and 25 angstroms with approximately 20 angstroms being preferred. The oxygen in the surfactant layer oxidizes the CoFe at the Cu/CoFe interface, thereby reducing interdiffusion between the Cu and the CoFe. The magnetization of the free layer is typically in the plane of the ABS and is indicated in the figure as arrow (45). A composite high-conductance layer (HCL) (65) is then formed on the free layer, the HCL being preferably a layer of Cu (66) formed to a thickness between approximately 5 and 10 angstroms, with approximately 5 angstroms being preferred on which is formed a layer of Ru (67) of thickness preferably between approximately 7.5 and 10 angstroms. The purpose of the HCL layer is to direct the sensing current along the free layer and, thereby, to significantly reduce or eliminate the magnetic field of the sensing current as a mechanism for adversely affecting the free layer bias point. It is also found (and discussed in connection with tables (a), (b) and (c) below), however, that the thicknesses of the two layers can be adjusted to control the magnetostriction of the free layer, whereby the Cu layer can effectively tune the magnetostriction towards negative values, while the Ru layer tunes towards positive values. Finally, a capping layer is formed (70) on the HCL, typically a Ta layer approximately 10-20 angstroms thick, with approximately 10 angstroms being preferred. When this sensor stack is exposed to an oxidizing ambient during annealing to fix the magnetizations of the pinned and free layers, (and, in addition, to an argon/oxygen plasma used in reactive ion etching (RIE) during subsequent sensor patterning described below), the capping layer (70) is oxidized within a width and to a depth depending upon the parameters of these processes and a TaO insulating layer (71) is formed which also serves as a specularly reflecting layer that greatly enhances sensor signal output.

Referring next to FIG. 2b, there is shown schematically the sensor stack of FIG. 2a over which has been formed a patterned lead layer (90). This sensor may also include horizontal biasing layers (not shown in detail) laterally disposed to either side of the stack. It is noted that this particular lead formation is shown for exemplary purposes and other lead/bias layer configurations (such as an abutted junction lead configuration) may be advantageously used in conjunction with either preferred stack embodiment to form a sensor that meets the objects of the present invention. The method of formation of the particular patterned lead layer shown in this figure(which is a lead overlay (LOL) configuration) is disclosed in Related Patent Application HT 01-029, Ser. No. 10/124,004, filing date Apr. 17, 2002, which is fully incorporated herein by reference. The sequential patterning process by which an opening (95) in the lead layer is formed, whose width defines a physical trackwidth for the sensor, includes an IBE etch followed by an Ar/$O_2$ RIE etch which, together, remove a portion of the lead layer (defining a trackwidth) and oxidize the Ta capping layer exposed within the trackwidth region to form thereupon a surface TaO layer (71). The process of depositing the lead layer (90) has necessitated prior removal of the oxide layer already present on the Ta surface, so the RIE etch restores oxide to the trackwidth region and produces a specularly reflecting TaO surface. Thus, in the RIE the Ta capping layer serves as an etch-stop layer and, in so doing, is advantageously oxidized to form a TaO specularly reflecting layer. However it is found that Ta is not a good barrier for preventing the diffusion of oxygen into the CoFe free layer, so a Ru diffusion barrier is formed beneath the Ta layer. This Ru layer produces little benefit to the GMR performance of the prior art CoFe—NiFe composite free layer as shown in FIG. 1. In the single, ultra-thin CoFe layer shown in the preferred embodiment of this figure, however, a sizeable effect is produced when the HCL is a Cu/Ru (65) layer as shown. This advantageous effect will be shown in tables (a)-(c) below.

Figure 3:
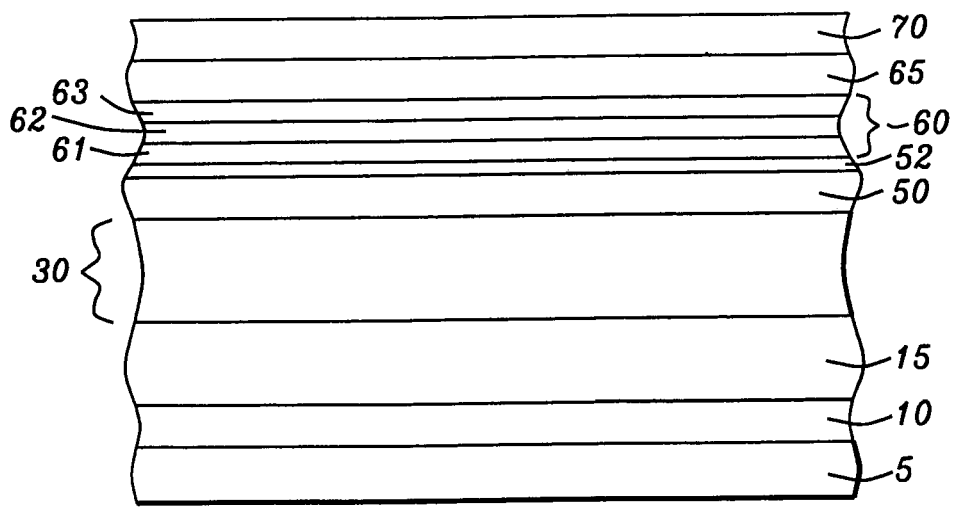
FIG. 3 is a schematic drawing of the sensor stack configuration of a second preferred embodiment of the present invention.

Referring next to FIG. 3, there is shown a schematic cross-sectional view through an ABS plane of the second preferred embodiment, ii), of the present invention. In this embodiment, the substrate (5), the seed layer (10), the antiferromagnetic pinning layer (15), the SyAF pinned layer (30), the non-magnetic spacer layer (50) and the oxygen surfactant layer (52) are formed identically to their counterparts in FIG. 2a. The free layer (60), however, differs substantially and, in this second preferred embodiment is a laminated layer comprising a first CoFe layer (61), formed to a thickness between approximately 15 and 18 angstroms, with approximately 17 angstroms being preferred, a second CoFe layer (63), formed to a thickness between approximately 2 and 5 angstroms, with approxmiately 3 angstroms being preferred and a Cu high-conductance layer (HCL) (62), formed between the two CoFe layers, to a thickness between approximately 2 and 3 angstroms, with approximately 3 angstroms being preferred. A Ru HCL (65) is then formed on the second CoFe layer with a thickness of between approximately 7.5 and 10 angstroms. Thus, in this embodiment, the Cu/Ru HCL is separated by the second CoFe layer. The Ta capping layer (70) is formed identically to the Ta capping layer of FIG. 2a. In addition, it is understood that patterned leads can be formed on the above described sensor stack in a manner identical to that discussed with reference to the sensor stack of embodiment i) in FIG. 2b.

Referring next to tables (a), (b), (c) and (d), there is presented experimental data supporting the advantageous qualities of the invention disclosed herein in its various embodiments. Table (a) lists, for comparison purposes only, the magnetic properties of a reference structure which is representative of a prior art sensor stack with a composite CoFe/NiFe free layer and a single Ru HCL:

a (a) NiCr 55/MnPt 100/CoFe 13/Ru 7.5/CoFe 15/Cu 18/SL/CoFe 5/NiFe 20/Ru10/Ta 10

| $B_s$ | $H_c$ | dR/R | Lambda |
|---|---|---|---|
| 0.20 | 12.91 | 12.08 | $1.5 \times 10^{-6}$ |

In this and the next three tables, (b), (c) and (d), $B_s$ is the saturation magnetization of the free layer/HCL combination, $H_c$ is a measure of the coercivity of the free layer (smaller values denote a "softer" layer), dR/R is the GMR ratio of the stack, which is an indication of its performance and Lambda is the coefficient of magnetostriction.

Table (b) is representative of the stack of embodiment i), but with only a Cu HCL:

b (b) NiCr 55/MnPt 100/CoFe 13/Ru 7.5/CoFe 15/Cu 18/SL/CoFe 20/Cu5/Ta 10

| $B_s$ | $H_c$ | dR/R | Lambda |
|---|---|---|---|
| 0.24 | 6.58 | 15.34 | $-6.0 \times 10^{-6}$ |

Table (c) is representative of the stack of embodiment i) with the identical Cu/Ru HCL of that embodiment:

c (c) NiCr 55/MnPt 100/CoFe 13/Ru 7.5/CoFe 15/Cu 18/SL/CoFe 20/Cu 5/Ru7.5/Ta 10

| $B_s$ | $H_c$ | dR/R | Lambda |
|---|---|---|---|
| 0.24 | 10.64 | 13.15 | $1.69 \times 10^{-6}$ |

As can be seen, adding the Ru layer to the Cu layer has improved the magnetostriction by changing it from negative to positive. Furthermore, the single CoFe free layer in (c) has a lower coercivity and yields a greater dR/R than the CoFe/NiFe layer in the prior art (a).

Table (d) below shows the effects of laminating the free layer by the insertion of a Cu layer of thickness X between two ferromagnetic CoFe layers. An HCL of Cu of thickness Y and Ru of thickness Z is formed over the laminated free layer. A laminated free layer is disclosed in preferred embodiment ii). The table summarizes the performance parameters of a stack having the form:

d (d) NiCr 55/MnPt 100/CoFe 13/Ru 7.5/CoFe 15/Cu 18/SL/CoFe 17/Cu X/CoFe 3/Cu Y/Ru Z/Ta 10.

| X | Y | Z | $B_s$ | $H_c$ | dR/R | Lambda |
|---|---|---|---|---|---|---|
| 3 | 2 | 10 | 0.23 | 9.02 | 13.10 | $-2.0 \times 10^{-6}$ |
| 3 | 0 | 10 | 0.22 | 9.56 | 13.28 | $1.7 \times 10^{-6}$ |
| 3 | 0 | 7.5 | 0.22 | 7.74 | 13.28 | $1.0 \times 10^{-6}$ |

As can be seen from the above table, the stack configuration of the last two rows have advantageous positive magnetostriction, high GMR ratio and very soft free layers. These are the stack configurations of preferred embodiment ii). In addition to the data presented in the tables above, annealing results done at high temperatures for long times (300° C. for 32 hours) demonstrate that the preferred embodiment stack formations of tables (c) and (d) are very robust and maintain their advantageous physical properties.

As is understood by a person skilled in the art, the preferred embodiment of the present invention is illustrative of the present invention rather than limiting of the present invention. Revisions and modifications may be made to methods, materials, structures and dimensions employed in fabricating and providing a bottom spin valve (BSV) giant magnetoresistive (GMR) sensor of the spin filter spin-valve (SFSV) type having a high-conductance layer, and a synthetic antiferromagnetic (SyAF) pinned layer, while still fabricating and providing such a bottom spin valve (BSV) giant magnetoresistive (GMR) sensor of the spin filter spin-valve (SFSV) type having a high-conductance layer, and a synthetic antiferromagnetic (SyAF) pinned layer, in accord with the spirit and scope of the present invention as defined by the appended claims.

What is claimed is:

1. A method for forming bottom spin valve (BSV) giant magnetoresistive (GMR) sensor of the spin filter spin-valve (SFSV) type having first and second high-conductance layers, wherein said first high conductance layer is embedded in a composite free layer, and also included is a synthetic antiferromagnetic (SyAF) pinned layer, the method comprising:

providing a substrate;

forming on the substrate a bottom spin valve stack, said formation further comprising:

forming a buffer layer;

forming an antiferromagnetic pinning layer on said buffer layer;

forming the synthetic antiferromagnetic (SyAF) pinned layer on said antiferromagnetic pinning layer;

forming a non-magnetic spacer layer on said SyAF pinned layer;

forming an oxygen surfactant layer on said spacer layer;

forming the composite free layer on said oxygen surfactant layer wherein said composite free layer includes said first high-conductance layer (HCL) formed of Cu;

forming said second high-conductance layer (HCL) on said composite free layer, said second HCL being formed of Ru;

forming a capping layer on said second HCL; and magnetizing said SyAF pinned layer in a direction transverse to an air bearing surface plane of said sensor.

2. The method of claim 1 wherein said buffer layer is a layer of NiCr, of approximately 40% Cr by atomic weight, formed to a thickness between approximately 50 and 60 angstroms.

3. The method of claim 1 wherein said antiferromagnetic pinning layer is a layer of MnPt formed to a thickness between approximately 80 and 150 angstroms.

4. The method of claim 1 wherein the SyAF pinned layer is formed by a method further comprising:

forming a second ferromagnetic layer on said antiferromagnetic pinning layer;

forming a non-magnetic antiferromagnetically coupling layer on said second ferromagnetic layer;

forming a first ferromagnetic layer on said coupling layer.

5. The method of claim 4 wherein the first ferromagnetic layer is a layer of CoFe formed to a thickness of between approximately 15 and 25 angstroms, and the second ferromagnetic layer is a layer of CoFe formed to a thickness of between approximately 12 and 20 angstroms.

6. The method of claim 4 wherein the non-magnetic antiferromagnetically coupling layer is a layer of Ru formed to a thickness of between approximately 7 and 8 angstroms.

7. The method of claim 1 wherein the non-magnetic spacer layer is a layer of Cu formed to a thickness of between approximately 16 and 20 angstroms and wherein a layer of oxygen is formed on said Cu layer by treatment of a surface of said Cu layer distal to said SyAF pinned layer in an oxygen ambient atmosphere and wherein said layer of oxygen acts as the oxygen surfactant layer.

* * * * *